United States Patent
Li et al.

(10) Patent No.: US 9,128,843 B2
(45) Date of Patent: Sep. 8, 2015

(54) METHOD AND COMPUTER SYSTEM FOR MEMORY MANAGEMENT ON VIRTUAL MACHINE SYSTEM

(71) Applicant: Industrial Technology Research Institute, Hsinchu (TW)

(72) Inventors: Han-Lin Li, Taoyuan County (TW); Tzi-Cker Chiueh, Taipei (TW); Jui-Hao Chiang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 163 days.

(21) Appl. No.: 13/951,475

(22) Filed: Jul. 26, 2013

(65) Prior Publication Data
US 2014/0108765 A1    Apr. 17, 2014

Related U.S. Application Data

(60) Provisional application No. 61/712,279, filed on Oct. 11, 2012.

(51) Int. Cl.
*G06F 12/00* (2006.01)
*G06F 12/08* (2006.01)
*G06F 9/455* (2006.01)
*G06F 12/02* (2006.01)
(Continued)

(52) U.S. Cl.
CPC .............. *G06F 12/08* (2013.01); *G06F 9/455* (2013.01); *G06F 9/45533* (2013.01); *G06F 9/45558* (2013.01); *G06F 12/02* (2013.01); *G06F 12/0223* (2013.01); *G06F 12/0253* (2013.01); *G06F 12/109* (2013.01); *G06F 12/123* (2013.01); *G06F 2009/45583* (2013.01)

(58) Field of Classification Search
CPC ............ G06F 9/45533; G06F 9/45558; G06F 2009/45583; G06F 12/02; G06F 12/023; G06F 12/08
See application file for complete search history.

(56) References Cited

U.S. PATENT DOCUMENTS

| 4,422,145 A | 12/1983 | Sacco et al. |
| 6,131,150 A | 10/2000 | DeTreville |

(Continued)

FOREIGN PATENT DOCUMENTS

| TW | 1308720 | 4/2009 |
| TW | 1342521 | 5/2011 |

OTHER PUBLICATIONS

Gupta, "Compcache: in-memory compressed swapping," Eklektix, Inc., May 26, 2009, pp. 1-8.
(Continued)

*Primary Examiner* — Shawn X Gu
(74) *Attorney, Agent, or Firm* — Jianq Chyun IP Office

(57) ABSTRACT

A method and a computer system for memory management on a virtual machine system are provided. The memory management method includes the following steps. First, a working set size of each of a plurality of virtual machines on the virtual machine system is obtained by at least one processor, wherein the working set size is an amount of memory required to run applications on each of the virtual machines. Then, an amount of storage memory is allocated to each of the virtual machines by the at least one processor according to the working set size of each of the virtual machines and at least one swapin or refault event, wherein the storage memory is a part of memory available from the computer system.

12 Claims, 3 Drawing Sheets

A working set size of each of the virtual machines on the virtual machine system is obtained by the processor. — S201

An amount of storage memory is allocated to each of the virtual machines by the processor according to the working set size of each of the virtual machines and at least one swapin or refault event. — S203

(51) Int. Cl.
*G06F 12/10* (2006.01)
*G06F 12/12* (2006.01)

(56) References Cited

U.S. PATENT DOCUMENTS

| | | |
|---|---|---|
| 6,516,397 B2 | 2/2003 | Roy et al. |
| 6,658,549 B2 | 12/2003 | Wilson et al. |
| 6,658,648 B1 | 12/2003 | Douceur et al. |
| 6,681,305 B1 | 1/2004 | Franke et al. |
| 6,804,754 B1 | 10/2004 | Franaszek et al. |
| 6,854,115 B1 | 2/2005 | Traversat et al. |
| 6,877,081 B2 | 4/2005 | Herger et al. |
| 6,910,106 B2 | 6/2005 | Sechrest et al. |
| 7,003,646 B2 | 2/2006 | Roy et al. |
| 7,007,150 B2 | 2/2006 | Valentin et al. |
| 7,127,560 B2 | 10/2006 | Cohen et al. |
| 7,181,736 B2 | 2/2007 | Douceur et al. |
| 7,380,089 B2 | 5/2008 | Herger et al. |
| 7,500,077 B2 | 3/2009 | Krauss |
| 7,516,291 B2 | 4/2009 | van Riel et al. |
| 7,698,513 B2 | 4/2010 | Sechrest et al. |
| 7,844,793 B2 | 11/2010 | Herger et al. |
| 7,934,035 B2 | 4/2011 | Miloushev et al. |
| 8,032,723 B2 | 10/2011 | Sechrest et al. |
| 8,099,487 B1 | 1/2012 | Smirnov et al. |
| 8,141,058 B2 | 3/2012 | Berg et al. |
| 8,161,260 B2 | 4/2012 | Srinivasan |
| 2009/0006801 A1* | 1/2009 | Shultz et al. ............... 711/170 |
| 2011/0138147 A1 | 6/2011 | Knowles et al. |
| 2012/0036325 A1 | 2/2012 | Mashtizadeh et al. |

OTHER PUBLICATIONS

Ghalimi, "Cloud Computing is Memory Bound" Intalio, Inc., May 2010, pp. 1-10.
Cook, "Memory: The Real Data Center Bottleneck," SYS-CON Media Inc., Dec. 10, 2009, pp. 1-3.
Williams et al., "Overdriver: Handling Memory Overload in an Oversubscribed Cloud," Proceedings of the 7th ACM SIGPLAN/SIGOPS international conference on Virtual execution environments, VEE '11, Mar. 9-11, 2011, pp. 205-216.
Waldspurger, "Memory Resource Management in VMware ESX Server," Proceedings of the 5th Symposium on Operating Systems Design and Implementation (OSDI' 02), Dec. 2002, pp. 1-14.
Lu et al., "Virtual Machine Memory Access Tracing With Hypervisor Exclusive Cache," Proceedings of the USENIX Annual Technical Conference (USENIX'07), Jun. 2007, pp. 1-15.
Zhao et al., "Dynamic Memory Balancing for Virtual Machines," VEE '09, Mar. 11-13, 2009, pp. 21-30.
Magenheimer, "add self-ballooning to balloon driver," Xen. org, Apr. 24, 2008, pp. 1-2.
Gupta et al, "Difference Engine: Harnessing Memory Redundancy in Virtual Machines," OSDI '08, Oct. 2008, pp. 1-14.
Magenheimer, "Transcendent Memory on Xen," Xen Summit, Feb. 2009, pp. 1-3.
"Office Action of Taiwan Counterpart Application", issued on Jun. 10, 2015, pp. 1-3.

* cited by examiner

METHOD AND COMPUTER SYSTEM FOR MEMORY MANAGEMENT ON VIRTUAL MACHINE SYSTEM

CROSS-REFERENCE TO RELATED APPLICATION

This application claims the priority benefits of U.S. provisional application Ser. No. 61/712,279, filed on Oct. 11, 2012. The entirety of the above-mentioned patent applications is hereby incorporated by reference herein and made a part of this specification.

TECHNICAL FIELD

The disclosure relates to a technique of memory management on a virtual machine system.

BACKGROUND

Computer virtualization is a technique involved in creation of a virtual machine that acts like a physical computing machine with an operating system, and a computer virtualization architecture is generally defined by the ability to concurrently support multiple operating systems on a single physical computer platform. For example, a computer that is running Microsoft Windows may host a virtual machine with a Linux operating system. A host machine is an actual physical machine on which the virtualization takes place, while a virtual machine is considered as a guest machine. A hypervisor, literally referred to as a virtual machine monitor (VMM), is a software layer that virtualizes hardware resources and presents a virtual hardware interface to at least one virtual machine. The hypervisor resembles to the way that a traditional operating system manages the hardware resources for processing and performs certain management functions with respect to an executing virtual machine. The virtual machine may be referred to as a "guest" and the operating system running inside the virtual machine may be referred to as a "guest OS".

The virtualized environment is currently memory-bound, which means that the physical memory of the host machine is the bottleneck of the resource utilization in a data center. Memory virtualization decouples the physical memory resources from the data center and then aggregates the resources into a virtualized memory pool which is accessible to the guest OS or applications running on top of the guest OS. In terms of memory virtualization, memory sharing is one of the crucial topics to the memory resource management and utilization.

When there are multiple virtual machines running on a host machine with low memory, memory distribution to the virtual machines becomes important to the application performance. The physical memory should be allocated among the virtual machines in a fair way, and such operation is defined as "memory balancing."

The simplest form of memory balancing is to divide the available physical memory by the number of virtual machines, and give each of the virtual machines an equal amount of memory. However, such mechanism does not take into account the working set size of each of the virtual machines, wherein the working set size is an amount of memory required to run applications on each of the virtual machines. That is, the implicit assumption of this approach is that each of the virtual machines is identical, including the applications running on top of the virtual machines and the input workloads.

Another approach is to assign to each of the virtual machines a percentage of the available physical memory that is proportional to each working set size. The intuition is to give larger amount of the memory to the virtual machine with larger demand on memory resource. With such allocation, the difference between the working set size of a virtual machine and its allocated memory is also proportional to the working set size of the virtual machine. This means that any additional event penalty (such as refault or swapin events) when the memory allocation of a virtual machine is decreased from its working set size to a fixed percentage of its working set size may be higher for virtual machines with a larger working set size.

To prevent the virtual machines from severe performance degradation due to insufficient memory, the performance overhead of each of the virtual machine running on the same host machine may require to be equalized by employing more suitable memory balancing mechanisms.

SUMMARY

One exemplary embodiment relates to a memory management method for a virtual machine system hosted by a computer system. The memory management method includes the following steps. First, a working set size of each of a plurality of virtual machines on the virtual machine system is obtained by at least one processor, wherein the working set size is an amount of memory required to run applications on each of the virtual machines. Then, an amount of storage memory is allocated to each of the virtual machines by the at least one processor according to the working set size of each of the virtual machines and at least one swapin or refault event, wherein the storage memory is a part of memory available from the computer system.

One exemplary embodiment relates to a computer system including a system memory and at least one processor. The at least one processor is coupled to the system memory and performs the following operation for memory management on a virtual machine system. The at least one processor obtains a working set size of each of a plurality of virtual machines on the virtual machine system, wherein the working set size is an amount of memory required to run applications on each of the virtual machines. The at least one processor further allocates an amount of storage memory to each of the virtual machines according to the working set size of each of the virtual machines and at least one swapin or refault event, wherein the storage memory is a part of memory available from the system memory.

In other to make the aforementioned and other features and advantages of the disclosure comprehensible, several exemplary embodiments accompanied with figures are described in detail below to further describe the disclosure in details.

BRIEF DESCRIPTION OF THE DRAWINGS

The accompanying drawings are included to provide a further understanding of the disclosure and are incorporated in and constitute a part of this specification. The drawings serve to illustrate exemplary embodiments of the disclosure and, taken together with the description, serve to explain the principles of the disclosure. However, they are not intended to limit the scope of the disclosure, which is defined by the accompany claims.

DETAILED DESCRIPTION OF DISCLOSED EMBODIMENTS

Figure 1A:
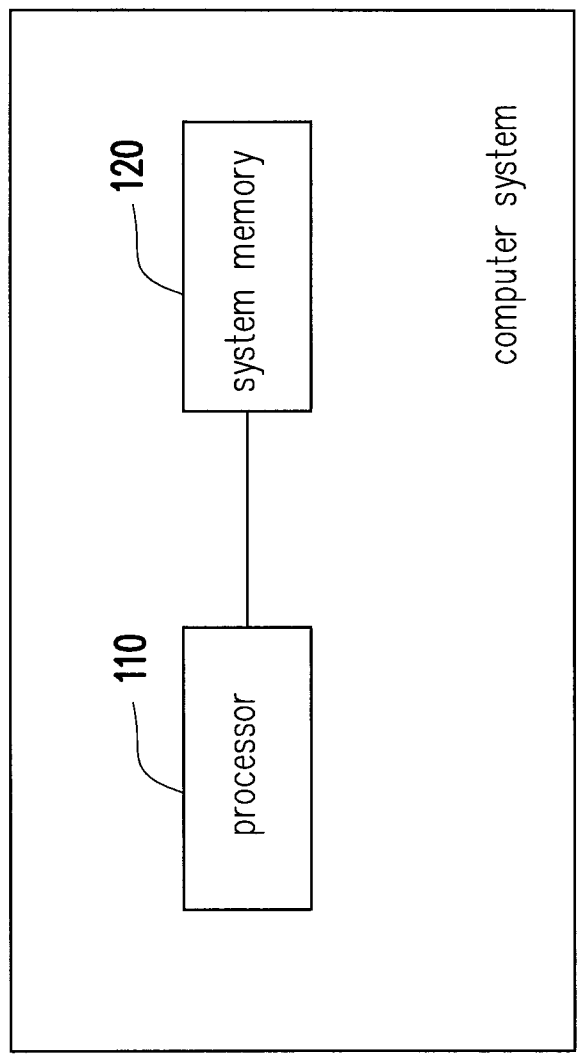
FIG. 1A is a block diagram of a computer system according to an exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

For illustration purpose, one processor and one system memory are used in the following exemplary embodiments, and yet the present disclosure is not limited thereto. In other exemplary embodiments, more than one processor could be used.

FIG. 1A is a block diagram of a computer system according to an exemplary embodiment of the present disclosure. Referring to FIG. 1, a computer system 100 includes a processor 110, a system memory 120, and other standard peripheral components (not shown), wherein the system memory 120 is coupled to the processor 110.

The processor 110 may be a dedicated or specialized processor configured to perform particular tasks by executing machine-readable software code languages that define functions related to operations to carry out the functional operations by communicating with other components of the computer system 100.

The system memory 120 stores software such as an operating system and temporarily stores data or application programs which are currently active or frequently used. Hence, the system memory 120, also referred to as a physical memory, may be a faster memory such as random access memory (RAM), a static random access memory (SRAM), or a dynamic random access memory (DRAM) for much faster access time.

Virtual memory is a technique for managing the resources of the system memory 120. It provides an illusion of a large amount of memory. Both the virtual memory and the system memory 120 are divided into blocks of contiguous memory addresses, which are also referred to as memory pages.

Figure 1B:
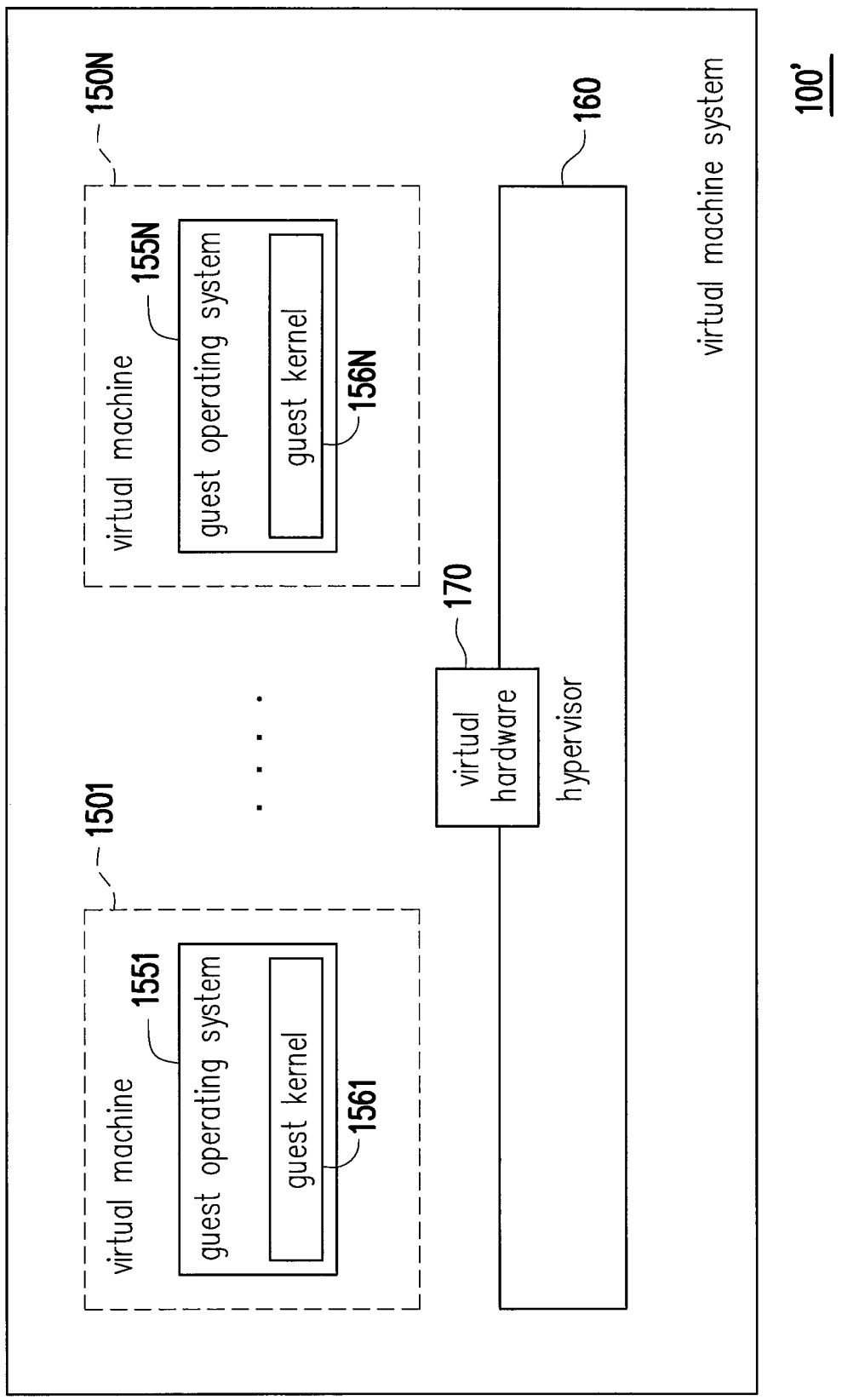
FIG. 1B is a block diagram of a virtual machine system according to an exemplary embodiment of the present disclosure.

A hypervisor is installed on the computer system 100 and supports virtual machine execution space within which multiple virtual machines may be concurrently instantiated and executed. FIG. 1B is a block diagram of a virtual machine system according to an exemplary embodiment of the present disclosure.

Referring to FIG. 1B along with FIG. 1A, a virtual machine system 100' includes a plurality of virtual machines 1501-150N, a hypervisor 160, and a virtual hardware 170. It is noted that, embodiments of the disclosure encompass the computer system 100 being capable of hosting the virtual machines 1501-150N simultaneously, and the two virtual machines 1501 and 150N are illustrated in the following embodiments for purposes of clarity and ease of explanation unless otherwise specified. Each of the virtual machines 1501 and 150N includes a guest OS, such as a guest OS 1551 or 155N, and various guest software applications (not shown). Each of the guest OSes includes a guest kernel, such as a guest kernel 1561 or 156N. The virtual hardware 170 including a processor, a memory, and I/O devices is abstracted and allocated as a virtual processor, a virtual memory, and virtual I/O devices to the upper running virtual machines 1501 and 150N. The hypervisor 160 manages the virtual machines 1501 and 150N and provides emulated hardware and firmware resources. In one of exemplary embodiments, Linux distributions may be installed as the guest OSes 1551 and 155N within the virtual machine 150 to execute any supported application, and open source software Xen supporting most Linux distributions may be provided as the hypervisor 160. Each of the guest kernels 1561 and 156N may be the dom0 kernel, and each of the guest OSes 1551 and 155N includes a balloon driver (not shown). In conjunction with the hypervisor 160, the balloon drivers may allocate or de-allocate the virtual memory for the virtual machines 1551 and 155N by invoking memory management algorithms. To achieve this, events, such as swapin and refault, at the guest kernels 1561 and 156N may be intercepted in order to quantify the performance overhead of the guest virtual machines 1501 and 150N, and the amount of memory allocated to the virtual machines 1501 and 150N may be adjusted to equalize the overhead of each of the virtual machines 1501 and 150N by leveraging page reclamation mechanisms of the guest OSes 1551 and 155N.

For page reclamation, the processor 110 uses a least recently used (LRU) criteria to determine an order in which to evict pages and maintains the LRU list 157 that orders all the memory pages ever accessed by the virtual machines 1501 and 150N according to the last access time for two major types of memory: an anonymous memory and a page cache. The memory pages of the anonymous memory are used by the heap and stack of user processes, and the memory pages of the page cache are backed by disk data where the content is cached in memory after the first access to the disk data to reduce future disk I/O.

On the virtual machine system 100', if a memory page on the LRU list is the anonymous memory, the guest kernels 1561 and 156N may swap the content to a swap disk (not shown), mark the corresponding PTE of the process to be not-present, and then free the corresponding memory page. Later on, if the memory page is accessed again, the COA (Copy-On-Access) mechanism is performed by bringing the page content from the swap disk into a newly allocated memory page, i.e., swap-in. Alternatively, if the memory page on the LRU list belongs to the page cache, the guest kernels 1561 and 156N may flush the page content to the swap disk if it has been dirtied, and then the page is freed. Upon a next file access, the guest kernels 1561 and 156N has to again perform the disk access, referred to as refault, to bring the content back to a newly allocated page in the page cache.

Figure 2:
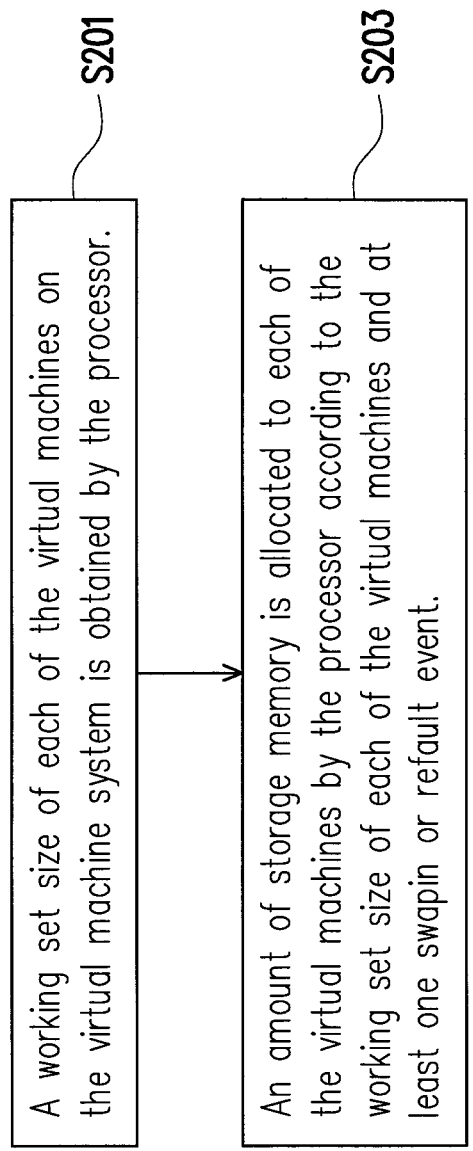
FIG. 2 is a memory management method on a virtual machine system according to an exemplary embodiment of the present disclosure.

FIG. 2 is a memory management method on a virtual machine system according to an exemplary embodiment of the present disclosure.

Before moving to FIG. 2, it is noted that a part of system memory 120 is available to the virtual machines 1501-150N, and the part of the system memory is defined as "storage memory." Now referring to FIG. 2 along with the components in FIG. 1A and FIG. 1B, a working set size of each of the virtual machines 1501-150N on the virtual machine system 100' is obtained by the processor 110 (Step S201). Then, an amount of the storage memory is allocated to each of the virtual machines 1501-150N by the processor 110 according to the working set size of each of the virtual machines 1501-150N and at least one swapin or refault event (Step S203). It is noted that the summation of the swapin count and refault count may be defined as an overhead count, which is also the number of pages faulted into a virtual machine.

To be more specific, in one of exemplary embodiments, it is first assumed that the overhead of each swapin and refault events is the same across different virtual machines 1501-

150N with different workloads and amounts of allocated memory. Given the amount of the storage memory $M_{Avail}$ and the N virtual machines, wherein the virtual machine 150$i$ has working set size $WSS_i$ for i=1, 2, ..., N, the processor 110 subtracts the storage memory $M_{Avail}$ from the summation of the working set size of each of the virtual machines $$\left(\sum_{i=1}^{N} WSS_i\right)$$

and then divides the subtraction result by the number of the virtual machines N. The division result is defined as a first reduction term. Then, the processor 110 subtracts the first reduction term from the working set size $WSS_i$ and produces the memory allocation or the balloon target for the virtual machine 150$i$. That is, the amount of the storage memory allocated to each of the virtual machines 1501-150N satisfies Eq. (1):

$$BT_i = WSS_i - \frac{\left(\sum_{i=1}^{N} WSS_i\right) - M_{Avail}}{N} \quad \text{Eq. (1)}$$

wherein $BT_i$ represents the amount of the storage memory allocated to the virtual machine 150$i$ (or the balloon target of the virtual machine 150$i$), $WSS_i$ represents the working set size of the virtual machine 150$i$, N represents the number of the virtual machines, and $M_{Avail}$ represents the amount of the storage memory.

As a numerical example of the present exemplary embodiment, suppose that the two virtual machines 1501 and 150N are given with the working set size 600 MB and 300 MB respectively, and the storage memory is 600 MB. First, the deficient amount of the storage memory is divided by 2 (i.e. 150 MB), and the same deficient amount is assigned to the two virtual machines 1501 and 150N by the processor 110. Then the virtual machines 1501 and 150N may be allocated by 450 MB (150 MB deficient) and 150 MB (150 MB deficient) respectively. The virtual machines 1501 and 150N are expected to have the same overhead count after memory allocation.

The assumption of the overhead of each swapin and refault event being the same across different virtual machines 1501-150N is not always true because the time cost of each swapin or refault event may vary within one virtual machine or between different virtual machines. For example, when the amount of the allocated memory of a virtual machine is much lower than its working set, (e.g. more modifications on the metadata of the swap subsystem), each swapin operation may be slow down. To remove this assumption, in another exemplary embodiment, it is aimed to balance the swapin and refault time among all the virtual machines 1501-150N. The summation of the swapin and refault time of each virtual machine 150$i$ is referred to as overhead_time$_i$ for i=1, 2, ..., n. The reduction in the memory allocation of the virtual machine 150$i$, defined as the second reduction term $S_i$, is proportional to the inverse of the overhead_time$_i$, which is the time spent on swapin and refault, because the higher overhead_time$_i$ is, the smaller the cut of the memory allocation of the virtual machine 150$i$ is. Then, the processor 110 subtracts the second reduction term from the working set size $WSS_i$ and produces the memory allocation or the balloon target for the virtual machine 150$i$. That is, the amount of the memory allocated to each of the virtual machines 1501-150N satisfies Eq. (2):

$$BT_i = WSS_i - \left[\left(\sum_{i=1}^{N} WSS_i\right) - M_{Avail}\right] \times \frac{\frac{1}{\text{overhead\_time}_i}}{\sum_{i=1}^{N} \frac{1}{\text{overhead\_time}_i}} \quad \text{Eq. (2)}$$

wherein $BT_i$ represents the amount of the storage memory allocated to the virtual machine i, $WSS_i$ represents the working set size of the virtual machine i, N represents the number of the virtual machines, $M_{Avail}$ represents the amount of the storage memory.

As a numerical example of the present exemplary embodiment, suppose that the two virtual machines 1501 and 150N are also given with the working set size 600 MB and 300 MB respectively, and the storage memory is 600 MB. Assume that the overhead_time$_i$ ratio of the virtual machines 1501 and 150N is 2:1 for i=1, N. In the present embodiment, the deficient amount is assigned to the virtual machines 1051 and 150N with inverse ratio of the overhead_time$_i$ (i.e. 100 MB deficient for the virtual machine 1501 and 200 MB deficient for the virtual machine 150N). Then, the final memory allocation is 500 MB for the virtual machine 1501 and 100 MB for the virtual machine 105N. The overhead_time$_i$ of the virtual machines 1501 and 105N are expected to be balanced and the performance overhead might be equalized.

It is noted that, the memory balancing mechanism is activated when the processor 110 detects that the memory of the hypervisor 160 is below a configured lower bound, such as 1%, for emergency memory pool of the hypervisor 160. The processor 110 may receive the swapin and refault information from the balloon driver of each of the virtual machines 1501-150N, decide the working set of each of the virtual machines 1501-150N, and calculate the new balloon target accordingly. Through the aforementioned memory management method, the performance overhead of all virtual machines 1501-150N so that each of them may degrade gracefully without starving on memory resource.

In an exemplary embodiment, the above-mentioned memory management method may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

To sum up, by leveraging an existing page reclamation mechanism of a guest OS, the memory management method in the present disclosure is designed to allocate an amount of storage memory to each virtual machine on a host system according to a working set size of each of the virtual machines and at least one swapin or refault event. By that means the performance overhead of each of the virtual machine running on the same host system may be equalized so as to prevent the virtual machines from severe performance degradation due to insufficient memory.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory management method for a virtual machine system hosted by a computer system comprising:

obtaining a working set size of each of a plurality of virtual machines on the virtual machine system by at least one processor, wherein each working set size is an amount of memory required to run applications on each of the virtual machines; and allocating an amount of storage memory to each of the virtual machines by the at least one processor according to the working set size of each of the virtual machines and at least one swapin or refault event, wherein the storage memory is a part of memory available from the computer system, and the step of allocating the amount of the storage memory to each of the virtual machines by the at least one processor according to the working set size of each of the virtual machines and the at least one swapin or refault event comprises:

allocating the amount of the storage memory to each of the virtual machines by the at least one processor according to the working set size of each of the virtual machines, and a first reduction term or a second reduction term, wherein the first reduction term is associated with an amount of the storage memory, a number of the virtual machines on the virtual machine system, and a summation of the working set size of each of the virtual machines, wherein the second reduction term is associated with an amount of the storage memory, the summation of the working set size of each of the virtual machines, and an overhead time according to the at least one swapin or refault event.

2. The memory management method in claim 1, wherein the step of allocating the amount of the storage memory to each of the virtual machines by the at least one processor according to the working set size of each of the virtual machines and the first reduction term comprises:

calculating the first reduction term by the at least one processor according to the working set size of each of the virtual machines, the summation of the working set size of each of the virtual machines, and the number of the virtual machines on the virtual machine system; and allocating the amount of the storage memory to each of the virtual machines by the at least one processor with each working set size subtracted by the first reduction term.

3. The memory management method in claim 2, wherein the amount of the memory allocated to each of the virtual machines satisfies Eq. (1):

$$BT_i = WSS_i - \frac{\left(\sum_{i=1}^{N} WSS_i\right) - M_{Avail}}{N} \quad \text{Eq. (1)}$$

wherein $BT_i$ represents the amount of the storage memory allocated to the virtual machine i, $WSS_i$ represents the working set size of the virtual machine i, N represents the number of the virtual machines, and $M_{Avail}$ represents the amount of the storage memory.

4. The memory management method in claim 1, wherein the step of allocating the amount of the storage memory to each of the virtual machines by the at least one processor according to the working set size of each of the virtual machines and the second reduction term further comprises:

calculating the second reduction term by the at least one processor according to the working set size of each of the virtual machines, the summation of the working set size of each of the virtual machines, the amount of the storage memory, the number of the virtual machines on the virtual machine system, and the overhead time according to the at least one swapin or refault event; and allocating the amount of the storage memory to each of the virtual machines by the at least one processor with each working set size subtracted by the second reduction term.

5. The memory management method in claim 4, wherein the second reduction term is inversely proportional to the overhead time.

6. The memory management method in claim 5, wherein the amount of the storage memory allocated to each of the virtual machines satisfies Eq. (2):

$$BT_i = WSS_i - \left[\left(\sum_{i=1}^{N} WSS_i\right) - M_{Avail}\right] \times \frac{\frac{1}{\text{overhead\_time}_i}}{\sum_{i=1}^{N} \frac{1}{\text{overhead\_time}_i}} \quad \text{Eq. (2)}$$

wherein $BT_i$ represents the amount of the storage memory allocated to the virtual machine i, $WSS_i$ represents the working set size of the virtual machine i, N represents the number of the virtual machines, $M_{Avail}$ represents the amount of the storage memory, and overhead_time$_i$ represents a summation of the swapin and a refault time of the virtual machine i.

7. A computer system comprising:

a system memory;

at least one processor, coupled to the system memory, wherein the at least one processor performs an operation for memory management on a virtual machine system, the operation comprising:

obtaining a working set size of each of a plurality of virtual machines on the virtual machine system, wherein each working set size is an amount of memory required to run applications on each of the virtual machines; and allocating an amount of storage memory to each of the virtual machines according to the working set size of each of the virtual machines and at least one swapin or refault event, wherein the storage memory is a part of memory available from the system memory, and the at least one processor allocates an amount of the storage memory to each of the virtual machines according to the working set size of each of the virtual machines, and a first reduction term or a second reduction term, wherein the first reduction term is associated with an amount of the storage memory, a number of the virtual machines on the virtual machine system, and a summation of the working set size of each of the virtual machines, wherein the second reduction term is associated with an amount of the storage memory, the summation of the working set size of each of the virtual machines, and an overhead time according to the at least one swapin or refault event.

8. The computer system in claim 7, wherein the at least one processor calculates the first reduction term according to the working set size of each of the virtual machines, the summation of the working set size of each of the virtual machines, and the number of the virtual machines on the virtual machine system as well as allocates an amount of the storage memory to each of the virtual machines with each working set size subtracted by the first reduction term.

9. The computer system in claim 8, wherein the amount of the memory allocated to each of the virtual machines satisfies Eq. (1):

$$BT_i = WSS_i - \frac{\left(\sum_{i=1}^{N} WSS_i\right) - M_{Avail}}{N} \qquad \text{Eq. (1)}$$

wherein $BT_i$ represents the amount of the storage memory allocated to the virtual machine i, $WSS_i$ represents the working set size of the virtual machine i, N represents the number of the virtual machines, and $M_{Avail}$ represents the amount of the storage memory.

10. The computer system in claim 7, the at least one processor calculates the second reduction term according to the working set size of each of the virtual machines, the summation of the working set size of each of the virtual machines, an amount of the storage memory, the number of the virtual machines on the virtual machine system, and the overhead time according to the at least one swapin or refault event as well as allocates an amount of the storage memory to each of the virtual machines by the at least one processor with each working set size subtracted by the second reduction term.

11. The computer system in claim 10, wherein the second reduction term is inversely proportional to the overhead time.

12. The computer system in claim 11, wherein the amount of the storage memory allocated to each of the virtual machines satisfies Eq. (2):

$$BT_i = WSS_i - \left[\left(\sum_{i=1}^{N} WSS_i\right) - M_{Avail}\right] \times \frac{\frac{1}{\text{overhead\_time}_i}}{\sum_{i=1}^{N} \frac{1}{\text{overhead\_time}_i}} \qquad \text{Eq. (2)}$$

wherein $BT_i$ represents the amount of the storage memory allocated to the virtual machine i, $WSS_i$ represents the working set size of the virtual machine i, N represents the number of the virtual machines, $M_{Avail}$ represents the amount of the storage memory, and overhead\_time$_i$ represents a summation of the swapin and a refault time of the virtual machine i.

* * * * *